Aug. 22, 1961 T. M. DANNBACK 2,997,238

MULTIPLIER

Filed Dec. 6, 1957

INVENTOR.
TOIVO M. DANNBACK

BY Walter J. Jason

ATTORNEY 2,997,238
MULTIPLIER

Toivo M. Dannback, San Diego, Calif., assignor to General Dynamics Corporation, San Diego, Calif., a corporation of Delaware Filed Dec. 6, 1957, Ser. No. 701,100
9 Claims. (Cl. 235—194)

Figures 1, 2, 3:
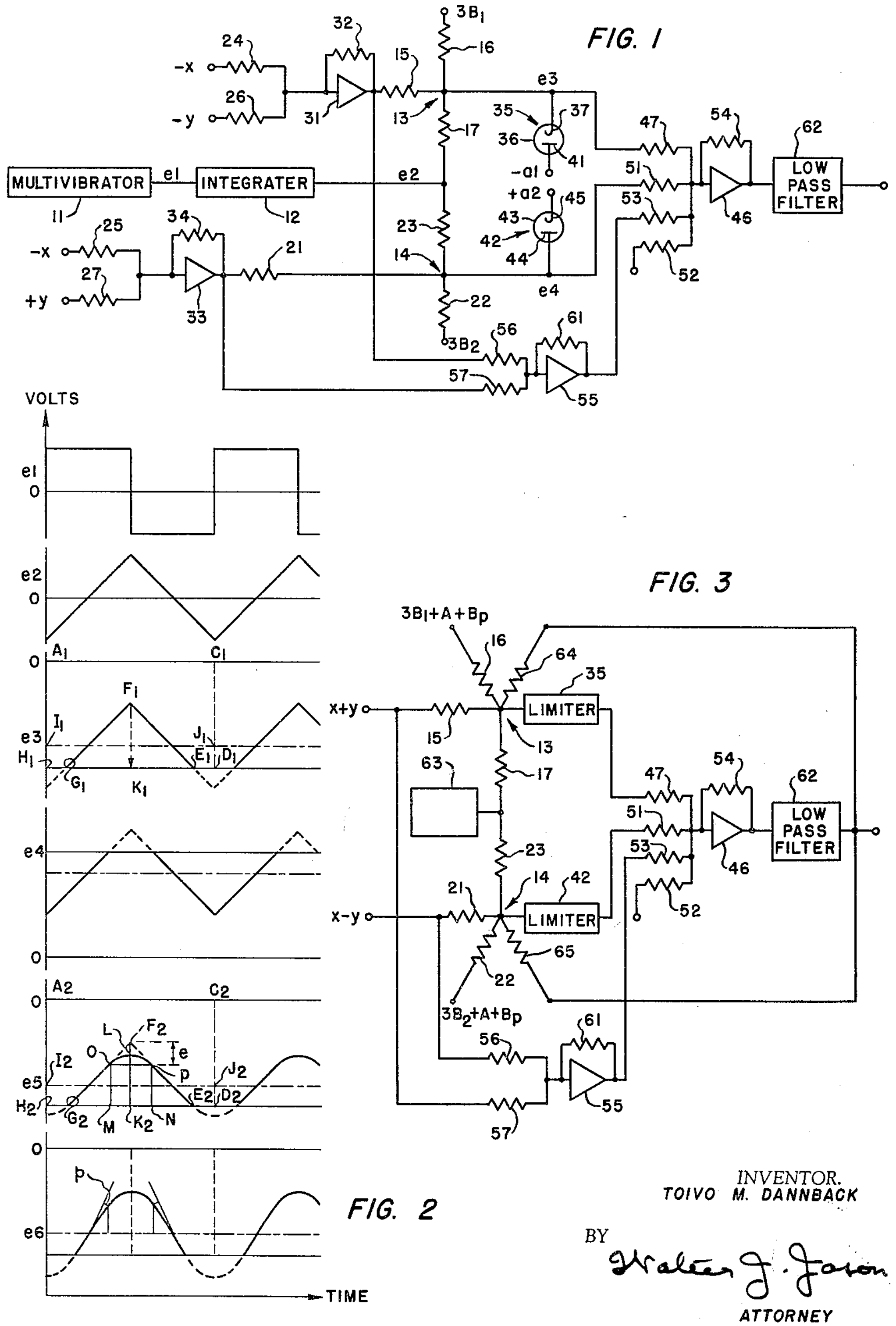

This invention relates to computing devices, and more particularly to an electronic analog multiplying device.

Electronic analog computers have long been widely employed to solve a great variety of scientific and engineering problems. In these devices, physical quantities, such as voltages and shaft rotations are made to obey mathematical relations similar to those of the original problem. These quantities which may be readily varied and measured, must behave in a manner analogous to the original variables which they simulate. Electronic analog computers simulate the original quantities by means of voltage levels. Direct voltage levels varying in accordance with the simulated variables are most frequently employed. Linear operations on these voltage levels, such as addition and subtraction, as well as integration and differentiation, may readily be accomplished by means of feedback amplifier devices, well known to those skilled in the art. However, multiplication and division cannot be achieved by such linear network devices, since multipliers must include devices whose amplication characteristics are dependent upon one or more of the applied voltages.

Multiplying devices presently employed in connection with electronic analog computers may be either electromechanical or electronic. Electromechanical devices include servo-operated potentiometers wherein potentiometers are positioned by a servo motor which is actuated by the output voltage from a differential amplifier responsive to a signal representing the position of one potentiometer slider in accordance with the value of one variable and a signal representing the value of a second variable. The slider of a second potentiometer also positioned by the servo motor, produces a voltage proportional to the product. Due to the high accuracy which may be obtained, servo operated potentiometer multipliers are widely used. Electrodynamometer type movements are also employed for multiplication. In these devices, a rotatable moving coil is mounted in the field of an electromagnet. A torque on the shaft of the moving coil is produced proportional to the product of the current flowing in the moving coil and the current flowing in the electromagnet. While such moving coil multipliers are faster acting than the above potentiometer type, they are not as accurate. As will be apparent, such electromechanical devices lack the inherent speed of operation of the electronic devices employed in the other computing circuits of electronic analog computers. When multiplication with great accuracy is required in the simulation of a problem in a computer, servo operated potentiometer multipliers must be employed in the set-up. As a result, the speed of the entire computer is held down to that of the slowest element, the servo operated multipliers.

Electronic analog computers are frequently employed to simulate various physical effects in connection with actual devices. Exemplarily, an automatic pilot may be connected to the computer, which is programmed to simulate the characteristics of an airplane or guided missile. In such a mode of operation, the computer must operate at extremely high speeds in order to accurately simulate the reaction of the airplane or missile to the automatic pilot. Mechanical multiplying devices, such as the servo operated potentiometer or the moving coil electrodynamometer type are much too slow in speed of response to be employed in such simulation. Various electronic multiplying devices have been devised having high multiplying speed. Modulated carrier type devices, cathode ray tubes, pulsed attenuators, and various devices employing non-linear vacuum tube characteristics are presently employed when high speed multiplication is required. However, such devices lack the great accuracy of the servo operated potentiometer multiplier. As a result, such high speed computations are limited in accuracy to that of the heretofore known electronic multipliers. Computations of such low accuracy are of limited value, and, therefore much of the potential utility of the analog computer is lost.

It will be apparent, therefore, that multiplying devices presently employed in connection with electronic analog computers fall into two distinct classes. One class provides great accuracy, but is severely limited in response time, while the other class offers high speed but is of relatively low accuracy. The multiplying device of the present invention combines the high speed of an electronic device with accuracy even greater than the electromechanical servo operated potentiometer type. A high frequency generator provides a periodic signal to a pair of biased limiters through a pair of summing networks. A first voltage representing the sum of the multiplier and multiplicand is applied to one limiter through its associated summing networks, and a second voltage representing the difference between the multiplier and multiplicand is applied to the other limiter through the summing network associated therewith. Output signals from both limiters are then added in a summing network, along with the sum and difference voltages representing the multiplier and multiplicand, and the high frequency periodic signal component is removed in a low pass filter network. The remaining low frequency signal voltage is proportional to the product of the multiplier and multiplicand voltages, as further disclosed herein below. Corrective networks may be employed to remove errors due to the shape of the high frequency period signal. Accuracies are obtained that are higher than that of the servo operated potentiometer multiplier and, indeed, higher than the accuracies of other computer components such as operational amplifiers. Speed of operation is limited only by the frequency of the periodic signal generator. Frequency of the periodic signal generator may be as high as desired, limited only by serious deterioration of the waveform generated. However, frequencies required to match other computer components may easily be generated by simple circuits well known to those skilled in the art.

It is, therefore, an object of this invention to provide an analog multiplier.

Another object of this invention is to provide an accurate, high speed electronic multiplier.

Another object of this invention is to provide a highly accurate analog multiplier having no moving parts.

Another object of this invention is to provide an accurate, high speed electronic analog multiplier which is simple and inexpensive to construct and easy to use.

These and other objects and advantages of this invention will be apparent from the following description and appended drawings, wherein:

FIGURE 1 schematically illustrates a first embodiment of this invention;

FIGURE 2 illustrates characteristic waveforms occurring at various points in the multiplier of this invention; and FIGURE 3 illustrates a second embodiment of this invention.

Referring now to FIGURE 1, a voltage representing multiplier $x$ is applied to multiplier input resistors 24 and 25 through a unity gain inverting operational amplifier, not shown, of a type well known to those skilled in the computer art. Similarly, multiplicand $y$ is applied to multiplicand input resistor 26 through a unity gain inverting operation amplifier, not shown. Multiplicand $y$ is also applied directly to multiplicand input resistor 27. Input resistors 24 and 26 form a portion of a unity gain feedback summing amplifier 31, having a feedback resistor 32. Similarly, input resistors 25 and 27 form a portion of unity gain feedback summing amplifier 33 having feedback resistor 34. Due to the phase inversion inherent in amplifiers 31 and 33, the output voltage from summing amplifier 31 is equal to the sum $x+y$ of the multiplier and multiplicand while the output voltage from summing amplifier 33 is equal to the difference, $x-y$, between the multiplier and multiplicand.

The sum $x+y$ from amplifier 31 is applied to summing resistor 15, forming part of resistive summing circuit 13. Summing circuit 13 also includes a bias summing resistor 16 and periodic function summing resistor 17. In a similar manner, the difference voltage, $x-y$, from amplifier 33 is applied to summing resistor 21, forming part of resistive summing circuit 14. Summing circuit 14 also includes bias summing resistor 22 and periodic function summing resistor 23.

A triangular periodic function is generated by multivibrator 11 and integrator 12. Integrator 12 is connected to periodic function summing resistors 17 and 23.

The output signal from resistive summing network 13, comprising the sum of the multiplier and multiplicand signals added to the triangular wave from integrator 13 of the periodic function generator, and a fixed bias voltage, are applied to a negative limiter 35 comprising, exemplarily, a diode 36 having a cathode 37 connected to the resistive summing network and an anode 41 connected to a fixed negative limiting voltage. In a similar manner, the output signal from resistive summing network 14, comprising the difference between the multiplier and multiplicand signals added to the triangular wave from integrator 13 of the periodic function generator, and a fixed bias voltage, are applied to a positive limiter 42, comprising, exemplarily, a diode 43 having an anode 44 connected to the resistive summing network and a cathode 45 connected to a fixed positive limit voltage source.

Output signals from limiter 35 and limiter 42 are applied to summing operational amplifier 46 and input summing resistors 47 and 51, respectively. A constant, error correcting voltage is applied to summing amplifier 46 through input summing resistor 52, and a dynamic error correcting voltage is applied to summing amplifier 46 through summing resistor 53. Summing amplifier 46 is also furnished with a feedback resistor 54. The dynamic error correcting voltage is obtained from summing amplifier 55, having input summing resistors 56 and 57, and feedback resistor 61. Input summing resistor 56 is connected to the output terminal of feedback amplifier 31, having a signal proportional to the sum of the multiplier and multiplicand, and input summing resistor 57 is connected to the output terminal of feedback amplifier 33, having a signal proportional to the difference between the multiplier and multiplicand. The sum of the input signals applied to input resistors 47, 51, 52 and 53 of summing amplifier 46 is applied to a low pass filter, or averaging circuit 62. Low pass filter 62, of a type well known to those skilled in the art, comprises a plurality of shunt capacitors and a plurality of series resistors or inductors adapted to remove the high frequency components introduced by the high frequency periodic generator from the output signal. The remaining signal voltage appearing at the output of low pass filter 62 is proportional to the product of the multiplier and multiplicand, both in absolute value and in sign.

Operation of the embodiment of this invention illustrated by FIGURE 1 will be explained in connection with the waveform diagrams of FIGURE 2. The signals representing the multiplier and multiplicand are in the form of direct voltages varying slowly in comparison with the frequency of the periodic signal generator. In accordance with the quarter-square principle of multiplication, the sum and difference voltages of the multiplier and multiplicand voltages are squared and one quarter of the difference between the square of the sum and the square of the difference is equal to the product. In equation form:

$$(x+y)^2-(x-y)^2=x^2+2xy+y^2-x^2+2xy-y^2=4xy$$

Summing operational amplifier 31, in cooperation with summing resistors 24 and 26 and feedback resistor 32, provides a signal voltage proportional to the sum of the multiplier and multiplicand. Feedback resistor 32 and summing resistors 24 and 26 are so proportional as to provide an output signal voltage $3(x+y)=3v_1$ from summing amplifier 31. In a similar manner, feedback resistor 34 and summing resistors 25 and 27 are so proportioned as to provide an output signal from operational amplifier 33 equal to $3(x-y)=3v_2$.

Signal $3v_1$ is applied to input resistor 15 of resistance summing network 13, and signal $3v_2$ is applied to resistor 21 of resistance summing network 14. A triangular wave $e_2$ of an amplitude 6E, generated by passing the square wave output $e_1$ from multivibrator 11 through integrator 12, is applied to input resistors 17 and 23 of resistance summing networks 13 and 14, respectively. In addition, fixed bias voltages $3B_1$ and $3B_2$ are applied to resistors 16 and 22 of resistance summing networks 13 and 14, respectively, to establish a zero reference level in the limiters, as further disclosed hereinbelow. Output signals from resistance summing network 13 are applied to the cathode 37 of limiter 35, including the sum voltage and the bias voltage $3B_1$, divided by 3 due to the losses in the three summing resistors, the triangular wave, and the reference level bias voltage.

Referring now to waveform $e_3$ in FIGURE 2, the value of bias voltage $B_1$ is at least equal to the peak to peak voltage of the triangular wave. Conveniently and preferably, $B_1$ is adjusted to be only slightly higher than the peak to peak voltage of the triangular wave, thereby enabling up and down excursions of the triangular wave substantially equal to one half the peak to peak voltage of the triangular wave. An additional, up or down variable excursion $v_1$ of the triangular periodic wave is proportional to the sum of the multiplier and multiplicand. It will be seen, therefore, that the signal applied to the limiter 35 comprises a triangular periodic wave imposed upon the sum of a fixed D.C. bias voltage and a varying D.C. voltage equal to the sum of the multiplier and multiplicand. Thus, the voltage relations in the resistive summing circuit 13 are:

$$\frac{3v_1-W_1}{R_{15}}+\frac{(-W_1)}{R_{17}}+\frac{3B_1-W_1}{R_{16}}=0$$

$$3v_1+3B_1=3W_1$$

and, $$W_1=v_1+B_1$$

where $W_1$ is the sum of the direct voltages applied to the limiter 35. A limit voltage $a_1$, of negative polarity, is applied to anode 41 of limiter diode 36. Since it is desirable that the voltage $v_2=-a_1$, or be slightly less than $-a_1$, and letting the sum voltage $3v_1=0$, it will be seen that $3B_1=3a_1$, and, therefore, the bias voltage $B_1$ is approximately equal to the negative limit voltage $-a_1$ applied to anode 41.

As disclosed hereinabove, a composite voltage representing the sum of the periodic wave, the voltage representing the sum of the multiplier and multiplicand, and the bias voltage is applied to each limiter. The mathematical relationships occurring in limiters 35 and 42 result in the squaring operation in the "quarter square" multiplication method. Waveform $e_3$ in FIGURE 2 illustrates the operation of the limiter 35. It will be apparent that the output voltage from limiter 35 is in the form of a negative voltage having periodic peaks rising toward zero level, one cycle of which is represented by the line $H_1G_1F_1E_1D_1$ in waveform $e_3$. The line $I_1J_1$ represents the reference level of the triangular periodic signal, the distance $A_1I_1$ represents the negative bias voltage $B_1$ plus the positive or negative sum voltage $v_1$ and the distance $A_1H_1$ represents the negative limit voltage $a_1$. It will be apparent that the only variable is the distance $A_1I_1$, dependent upon the amplitude and polarity of the sum $v_1$ of the multiplier and multiplicand. The voltage represented by distance $A_1I_1$ serves to raise and lower the triangular wave with respect to the limit level voltage $a_1$, represented by the distance $A_1H_1$.

It will be apparent that the area $A_1H_1G_1F_1E_1D_1C_1$ will vary as the sum input level varies the amount by which the lower portion of the triangular wave is limited. Denoting this area by X, $$X=a_1b_1-[(h_1+v_1)^2k]$$

wherein the term $a_1b_1$ is the area of the rectangle $A_1H_1D_1C_1$, determined by the limit voltage $a_1$ and the lenth of one cycle of the triangular periodic wave, and the term $(h_1+v_1)^2k$ represents the area of the triangle above the limit voltage level. The term $k$ is a constant equal to the ratio of the base to twice the height of the triangular wave. Thus, $$k=\frac{G_1E_1}{2F_1K_1}=\frac{b}{2h}$$

The area of the triangle above the limiting level is equal to one half the base multiplied by the height. The height $F_1K_1$ is equal to limit level $h$ plus the signal level $v_1$. Calling this height A, the area is equal to $$\frac{Ab}{2}$$

Solving for the factor $b, b=k2h$.

Substituting, the area of the triangle $=\frac{Ak2A}{2}$ and, therefore, $A^2k$. It will be apparent, therefore, that the area of the rectangle $A_1H_1D_1C_1$ minus the area of the triangle $G_1F_1E_1$ after limiting is equal to X, where $$X=a_1b_1-[(h_1+v_1)^2k]$$

Expanding, $$X=a_1b_1-h_1^2k-2h_1kv_1-v_1^2k$$

$$X=(a_1b_1-h_12k)-2h_1kv_1-v_1^2k$$

Letting $$A'=a_1b_1-h_1^2k \text{ and } -B'=-2h_1k$$

$X=A'-B'v_1-kv_1^2$ at the output of limiter 35. In a similar manner, the output of limiter 42 may be shown to be of the form $Y=A''+B''v_2-kv_2^2$ wherein Y is of negative polarity.

The two signals from the limiters are applied to input resistors 47 and 51 of summing operational amplifier 46. Since A′ and A″ are composed entirely of constant terms representing the limit voltages $a_1$ and $a_2$, the area of the rectangles, and the constant ratio term $k$, a constant bias voltage $E_0=-(A''-A')$ is applied to input resistor 52 of summing operational amplifier 46. The term $$-(B'v_1+B''v_2)$$

is eliminated by applying the output signal from summing operational amplifier 55 to input resistor 53 of summing operational amplifier 46. Sum input term $v_1$ is applied to input resistor 56 and difference input term $v_2$ is applied to input resistor 57 of summing amplifier 55.

The B′ and B″ terms are constants dependent upon the limit voltages and the ratio $k$. The term B′, as disclosed hereinabove, varies with the constant term $k$ dependent upon one period of the triangular periodic wave, and the constant limit voltage $a_1$. Similarly, the B″ term is also dependent upon the constant term $k$, and upon constant limit voltage $a_2$. Constant term B′ is removed from the output by inserting an equal and opposite voltage by the relative proportioning of feedback resistor 61 and input resistor 56. Similarly, constant term B″ is removed by properly proportioning feedback resistor 61 with respect to input resistor 57, in a manner well known to those skilled in the art.

It will be seen, therefore, that voltages representing $X, Y$, $-(A''-A')$, and $-(B'v_1+B''_2)$ are summed by operational amplifier 46. Thus, the output voltage from summing operational amplifier 46 includes $$[(A'-B'v_1-kv_1^2-A''+B''v_2-kv_2^2)+(B'v_1-B''v_2)+(A''-A')]=2k(v_2^2-v_1^2)$$

By properly proportioning the resistance of feedback resistor 54 with respect to the resistance of input resistors 47 and 51, the constant term $-2k$ may be made equal to 1/4. Low pass filter 62 serves to smooth the output signal, storing energy from the peaks of the output signal due to the periodic wave, and releasing the energy to fill in the valleys. Since the frequency of the periodic wave is many times greater than the highest signal frequencies, the output voltage from the low pass filter 62 is equal to $1/4\ (v_1^2-v_2^2)$. Since $v_1=x+y$ and $v_2=x-y$, it will be apparent that the condition for quarter-square multiplication, $$xy=1/4[x+y)^2-(x-y)^2]$$

is met, and the output signal voltage is equal to the product of the input signal voltages representing the multiplier and multiplicand.

The description of the operation of the embodiment of this invention disclosed hereinabove in connection with FIGURE 1 has assumed generation of a perfect triangular periodic wave by multivibrator 11 and integrator 12. However, generation of such a perfect, sharp peaked triangular wave is not essential to the accurate operation of the multiplier of this invention. A triangular wave with rounded edges, a trapezoidal wave, or even a sine wave may be employed in place of the triangular wave disclosed hereinabove.

An imperfect triangular wave which may have rounded instead of sharp peaks may be employed in connection with this invention with no loss in accuracy provided rising and falling sections of the wave are linear. Such a triangular wave, illustrated by $e_5$ in FIGURE 2, may readily be generated by simple, commonly available devices well known to those skilled in the art.

It may be demonstrated that errors caused by rounding of the triangular wave peaks may easily be corrected by appropriate adjustment of bias voltages.

The area $A_2H_2G_2OLPE_2D_2C_2$ is equal to $X_2$ for one cycle of the wave $e_5$, illustrated in FIGURE 2. The area of curved, non-linear portion OLP is designated $r$, and E is the height of the triangle $OF_2P$. The area of $X_2$ is, therefore, $$X_2=a_2b_2-[(h_2+v_2)^2k-E^2k+r]$$

It will be seen that the terms defining $X_2$ are identical with the terms defining $X_1$, disclosed hereinabove, with the addition of the $-E^2k+r$ term. By means of an analysis similar to that disclosed hereinabove in connection with $X_1$, it may be demonstrated that $$A_2'=a_2b_2-h_2^2k+E^2k-r, \text{ and } -B_2'=2h_2k$$

Since the two areas $E^2k$ and $r$ are constants, it will be apparent that $A_2'$ and $A_2''$ may be compensated in a manner similar to A′ by merely adjusting bias voltage $E_0$ applied to input resistor 52 of summing operational amplifier 46. The $B_2'$ term is identical to the B′ term, and is compensated for in an identical manner.

While employment of a triangular or trapezoidal wave periodic signal having linearly rising and falling sections are presently preferred, a highly accurate multiplying device may be constructed in accordance with this invention wherein a sine wave periodic signal is employed. Referring to FIGURE 3, an embodiment of this invention employing a sine wave periodic signal generator 63 is illustrated. Sine wave generator 63 is connected to summing resistors 17 and 23 of summing junctions 13 and 14 in place of the triangular wave generator of FIGURE 1. In addition, feedback summing resistors 64 and 65 are connected to summing networks 13 and 14, respectively. Both of resistors 64 and 65 are connected to the output of low pass filter 62. The rest of the circuit of the embodiment of FIGURE 3 is identical to the circuit of the embodiment of FIGURE 1.

The signal applied to the limiters 35 and 42 in the embodiment of FIGURE 3 is illustrated by waveform $e_6$ of FIGURE 2. Since a sine wave does not have any linear sides, it is necessary to apply a suitable compensating signal thereto.

It may be shown mathematically that the error due to employing a sine wave is equal to the difference between the area of the equivalent triangle on trapezoid and the area covered by the sine wave. This area is traced out by the distance $p$ between the sine wave and a straight line tangent to the sine wave at the zero axis of the sine wave. The area $\Delta e$, illustrated in waveform $e_6$ of FIGURE 2, may be added to the sine wave signal to correct the error. The error value $\Delta e$ is in the form $$A+Bp+Cp^2=\Delta e$$

wherein A, B and C are constants and $p$ is equal to the distance between the tangent to the sine wave and the sine wave. Referring to FIGURE 3, the A and Bp terms are compensated by adjusting the bias voltage $3B_2$, applied to resistors 16 and 22 of summing resistor junctions 13 and 14. The $Cp^2$ term is compensated for by feeding back a portion of the output signal from low pass filter 62 to summing resistors 64 and 65, forming part of summing junctions 13 and 14, respectively, in FIGURE 3. Resistors 64 and 65 may be adjusted in value to compensate for any given amplitude of sine wave. While the accuracy of the multiplier is reduced somewhat, simplification of the periodic wave generator is enabled by such modification of this invention.

The hereinabove disclosed embodiments are illustrative of specific forms of this invention. It will be understood this invention is not limited thereto, as many variations will become apparent to those skilled in the art, and the invention is to be given its broadest possible interpretation within the terms of the appended claims.

What I claim is:

1. In a quarter-square analog multiplier for obtaining the product of a multiplier and a multiplicand, the combination of a first summing circuit, means for applying a first signal representing the sum of said multiplier and multiplicand to said first summing circuit, a second summing circuit, means for applying a second signal representing the difference of said multiplier and multiplicand to said second summing circuit, a periodic wave generator, means for applying a periodic wave signal from said periodic wave generator to said first and second summing circuits, means for applying a constant voltage to said first and second summing circuits, a first limiter connected to the output of said first summing circuit, a second limiter connected to the output of said second summing circuit, a third summing circuit connected to said first and second limiters, means for applying said first and second signals to said third summing circuit, and an averaging circuit connected to said third summing circuit for recovering a signal representing the product of said multiplier and multiplicand.

2. In a quarter-square analog multiplier for obtaining the product of a multiplier and a multiplicand, the combination of a first summing circuit, means for applying a first signal representing the sum of said multiplier and multiplicand to said first summing circuit, a second summing circuit, means for applying a second signal representing the difference of said multiplier and multiplicand to said second summing circuit, a periodic wave generator, means for applying a periodic wave signal from said periodic wave generator to said first and second summing circuits, means for applying a constant voltage to said first and second summing circuits, a first limiter connected to the output of said first summing circuit, a second limiter connected to the output of said second summing circuit, means for applying limit voltages to said first and second limiters, a third summing circuit connected to said first and second limiters, means for applying said first and second signals to said third summing circuit, and an averaging circuit connected to said third summing circuit for recovering a signal representing the product of said multiplier and multiplicand.

3. In a quarter-square analog multiplier for obtaining the product of a multiplier and a multiplicand, the combination of a first summing circuit, means for applying a first signal representing the sum of said multiplier and multiplicand to said first summing circuit, a second summing circuit, means for applying a second signal representing the difference of said multiplier and multiplicand to said second summing circuit, a periodic wave generator, means for applying a periodic wave signal from said periodic wave generator to said first and second summing circuits, means for applying a constant voltage to said first and second summing circuits, a first limiter connected to the output of said first summing circuit, means for applying a first limit voltage to said first limiter, a second limiter connected to the output of said second summing circuit, means for applying a second limit voltage to said second limiter, a third summing circuit connected to said first and second limiters, means for applying said first and second signals to said third summing circuit, and an averaging circuit connected to said third summing circuit for recovering a signal representing the product of said multiplier and multiplicand.

4. In a quarter-square analog multiplier for obtaining the product of a multiplier and a multiplicand, the combination of a first summing circuit, means for applying a first signal representing the sum of said multiplier and multiplicand to said first summing circuit, a second summing circuit, means for applying a second signal representing the difference of said multiplier and multiplicand to said second summing circuit, a periodic wave generator, means for applying a periodic wave signal from said periodic wave generator to said first and second summing circuits, means for applying a constant voltage to said first and second summing circuits, a negative limiter connected to the output of said first summing circuit, means for applying a first limit voltage to said negative limiter, a positive limiter connected to the output of said second summing circuit, means for applying a second limit voltage to said positive limiter, a third summing circuit connected to said negative and positive limiters, means for applying said first and second signals to said third summing circuit, and an averaging circuit connected to said third summing circuit for recovering a signal representing the product of said multiplier and multiplicand.

5. In a quarter-square analog multiplier for obtaining the product of a multiplier and a multiplicand, the combination of a first summing circuit, means for applying a first signal representing the sum of said multiplier and multiplicand to said first summing circuit, a second summing circuit, means for applying a second signal representing the difference of said multiplier and multiplicand to said second summing circuit, a periodic wave generator, means for applying a periodic wave signal from said periodic wave generator to said first and second summing circuits, means for applying a constant voltage to said first and second summing circuits, a negative limiter connected to the output of said first summing circuit, means for applying a negative limit voltage to said negative limiter, a positive limiter connected to the output of said second summing circuit, means for applying a positive limit voltage to said positive limiter, a third summing circuit connected to said negative and positive limiters, means for applying said first and second signals to said third summing circuit, and an averaging circuit connected to said third summing circuit for recovering a signal representing the product of said multiplier and multiplicand.

6. In a quarter-square analog multiplier for obtaining the product of a multiplier and a multiplicand, the combination of a first summing circuit, means for applying a first signal representing the sum of said multiplier and multiplicand to said first summing circuit, a second summing circuit, means for applying a second signal representing the difference of said multiplier and multiplicand to said second summing circuit, a triangular wave generator, means for applying a triangular wave signal from said triangular wave generator to said first and second summing circuits, means for applying a constant voltage to said first and second summing circuits, a negative limiter connected to the output of said first summing circuit, means for applying a negative limit voltage to said negative limiter, a positive limiter connected to the output of said second summing circuit, means for applying a positive limit voltage to said positive limiter, a third summing circuit connected to said negative and positive limiters, means for applying said first and second signals to said third summing circuit, and an averaging circuit connected to said third summing circuit for recovering a signal representing the product of said multiplier and multiplicand.

7. In a quarter-square analog multiplier for obtaining the product of a multiplier and a multiplicand, the combination of a first summing circuit, means for applying a first signal representing the sum of said multiplier and multiplicand to said first summing circuit, a second summing circuit, means for applying a second signal representing the difference of said multiplier and multiplicand to said second summing circuit, a triangular wave generator, means for applying a triangular wave signal from said triangular wave generator to said first and second summing circuits, means for applying a constant voltage to said first and second summing circuits, a negative diode limiter connected to the output of said first summing circuit, means for applying a negative limit voltage to the anode of said negative limiter, a positive diode limiter connected to the output of said second summing circuit, means for applying a positive limit voltage to the cathode of said positive limiter, a third summing circuit connected to said negative and positive limiters, means for applying said first and second signals to said third summing circuit, and an averaging circuit connected to said third summing circuit for recovering a signal representing the product of said multiplier and multiplicand.

8. In a quarter-square analog multiplier for obtaining the product of a multiplier and a multiplicand, the combination of a first summing circuit, means for applying a first signal representing the sum of said multiplier and multiplicand to said first summing circuit, a second summing circuit, means for applying a second signal representing the difference of said multiplier and multiplicand to said second summing circuit, a sinusoidal wave generator, means for applying a sinusoidal signal from said sinusoidal wave generator to said first and second summing circuits, means for applying a constant voltage to said first and second summing circuits, a negative limiter connected to the output of said first summing circuit, means for applying a negative limit voltage to said negative limiter, a positive limiter connected to the output of said second summing circuit, means for applying a positive limit voltage to said positive limiter, a third summing circuit connected to said negative and positive limiters, means for applyng said first and second signals to said third summing circuit, means for applying an error-correcting voltage to said third summing circuit, and an averaging circuit connected to said third summing circuit for recovering a signal representing the product of said multiplier and multiplicand.

9. In a quarter-square analog multiplier for obtaining the product of a multiplier and a multiplicand, the combination of a first summing circuit, means for applying a first signal representing the sum of said multiplier and multiplicand to said first summing circuit, a second summing circuit, means for applying a second signal representing the difference of said multiplier and multiplicand to said second summing circuit, a sinusoidal wave generator, means for applying a sinusoidal signal from said sinusoidal wave generator to said first and second summing circuits, means for applying a constant voltage to said first and second summing circuits, a negative diode limiter connected to the output of said first summing circuit, means for applying a negative limit voltage to the anode of said negative limiter, a positive diode limiter connected to the output of said second summing circuit, means for applying a positive limit voltage to the cathode of said positive limiter, a third summing circuit connected to said negative and positive limiters, means for applying said first and second signals to said third summing circuit, means for applying an error-correcting voltage to said third summing circuit, and an averaging circuit connected to said third summing circuit for recovering a signal representing the product of said multiplier and multiplicand.

References Cited in the file of this patent

UNITED STATES PATENTS 2,674,409 Lakatos ---------------- Apr. 6, 1954

UNITED STATES PATENT OFFICE

CERTIFICATE OF CORRECTION

Patent No. 2,997,238 August 22, 1961

Toivo M. Dannback

It is hereby certified that error appears in the above numbered patent requiring correction and that the said Letters Patent should read as corrected below.

Column 2, line 38, for "period" read -- periodic --; column 6, line 16, for "$[(A'-B'v_1-kv_1^2-A''+$" read -- $-[(A'-B'v_1-kv_1^2-A''+$ --; line 17, for "$+(A''-A')]=2k(v_2^2-v_1^2)$" read -- $+(A''-A')]=-2k(v_2^2-v_1^2)$ --; line 31, for "$xy=\frac{1}{4}[x+y)^2-$" read -- $xy=\frac{1}{4}[(x+y)^2-$ --; column 10, line 19, for "applyng" read -- applying --.

Signed and sealed this 6th day of February 1962.

(SEAL)
Attest:

ERNEST W. SWIDER
Attesting Officer

DAVID L. LADD
Commissioner of Patents